Aug. 23, 1960     A. BÄAB     2,949,837
IRIS DIAPHRAGM FOR PHOTOGRAPHIC OR CINEMATOGRAPHIC OBJECTIVES
Filed Dec. 1, 1958
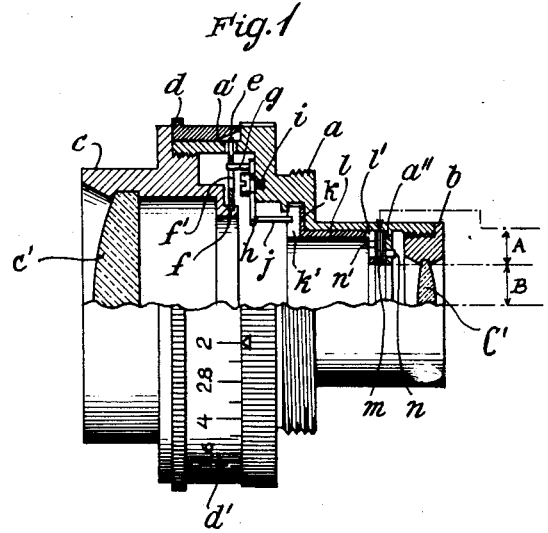
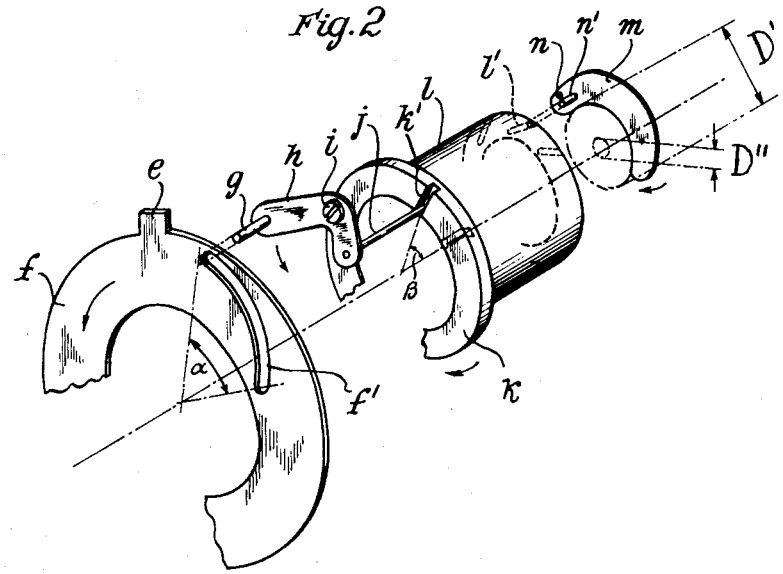
INVENTOR:
Albert BÄAB
BY
Agent 2,949,837
IRIS DIAPHRAGM FOR PHOTOGRAPHIC OR CINEMATOGRAPHIC OBJECTIVES Albert Bäab, Kreuznach, Rhineland, Germany, assignor to Jos. Schneider & Co., Optische Werke, Kreuznach, Rhineland, Germany, a corporation of Germany Filed Dec. 1, 1958, Ser. No. 777,504

Claims priority, application Germany Dec. 7, 1957

6 Claims. (Cl. 95—64)

My present invention relates to an iris diaphragm for photographic or cinematographic objectives, particularly for those of small dimensions.

Iris diaphragms generally consist of arcuate leaves whose inner and outer edges are part of two substantially concentric circles. The diameter of the outer circle determines the overall size of the diaphragm whereas the diameter of the inner circle delimits its maximum opening. In the case of small cameras of large relative aperture, the ratio between the larger and the smaller diameter is reduced so that the iris leaves are more slender and a larger number thereof are required to close the diaphragm to a desired minimum opening. This dimensioning reduces the available spacing between the fixed pivot of each leaf and its guide pin which enters a groove in the usual diaphragm-control ring, these grooves in turn requiring such a positioning on the control ring (particularly if the diaphragm opening is to vary linearly with the ring's rotation) that the entire range of wide-open to nearly closed diaphragm position is spanned by a very small angular displacement of that ring. This is inconvenient because the markings of the associated diaphragm scale, to be legible, must extend over a considerable arc on the objective housing.

Attempts have heretofore been made to avoid this difficulty by a more oblique arrangement of the guide grooves in the control ring which, in the case of small iris diaphragms, cannot be done without allowing the grooves to intersect one another. To solve this difficulty, prior proposals have made use of differently shaped and/or differently anchored iris leaves sharing a common groove. Such diaphragms are expensive to manufacture and to assemble because of the simultaneous use of different types of leaves and because of the close tolerances required.

My invention has for its object the provision of simplified means for controlling an iris diaphragm of relatively small diameter ratio by means of a setting ring displaceable over a relatively wide angular operating range.

The invention, while utilizing an iris diaphragm having but one type of leaves, realizes the above object by the provision of a step-down transmission between the setting ring and the diaphragm-control ring. This transmission, in a preferred embodiment, may comprise a bell-crank lever having a long and a short arm in camming engagement with two intermediate annular members respectively coupled with the setting ring and the control ring.

The invention will be described in greater detail with reference to the accompanying drawing in which:

Fig. 1 is a side-elevational view, partly in axial section, of a camera objective embodying the invention; and Fig. 2 is an exploded perspective view of part of the objective of Fig. 1.

The objective shown in the drawing comprises a housing $a$ joining a support $b$ for a rear lens $C'$ to a support $c$ for a front lens $c'$. The housing $a$ is slotted at $a'$ to provide a clearance for a peripheral lug $e$ on a coupling ring $f$ which is rotatably mounted on a rear shoulder of lens support $c$, the lug $e$ engaging a cutout of a setting ring $d$ which surrounds the housing and carries a diaphragm scale $d'$. Coupling ring $f$ is provided with a camming slot $f'$ receiving a pin $g$ on the longer arm of a bell-crank lever $h$ which is pivoted on the housing by means of a stud $i$; the shorter arm of this lever carries a pin $j$ entering a camming slot $k'$ in an annular front flange $k$ of a tubular member $l$ whose rear face, representing the usual diaphragm-control ring, is provided with a series of oblique grooves $l'$. An iris diaphragm, positioned in housing $a$ just ahead of rear lens $C'$, consists of a plurality of arcuate leaves $m$ each swingable about a respective pivot stud $n$ which is journaled in an annular shoulder $a''$ of the housing. Each leaf $m$ also carries a pin $n'$ entering a respective groove $l'$ in the control tube $l$. Members $d, f, l$ and $a''$ are all coaxial with one another and with the generally cylindrical housing $a$.

The width A (Fig. 1) of the iris leaves $m$, given as the difference of the radii of their outer and inner arcuate edges, is somewhat less than the radius B of the inner arc which also defines the maximum diaphragm opening; in Fig. 2 the diameters of the largest and the smallest diaphragm opening have been designated $D', D''$. To pass from diameter $D'$ to diameter $D''$, or vice versa, the control member $l$ must be rotated through a small angle $\beta$. This angle corresponds, owing to the provision of the transmission $g$—$j$, to a considerably larger operating angle $\alpha$ for the coupling ring $f$ and, therefore, for the setting ring $d$ and its scale $d'$. Thus, the markings of the scale may be conveniently placed on the periphery of ring $d$.

My invention is, of course, not limited to the specific step-down transmission described and illustrated, various modifications thereof being deemed to come within its scope as defined in the appended claims.

I claim:

1. In a camera objective, in combination, an iris diaphragm, a control ring for said diaphragm provided with grooves, said diaphragm comprising a plurality of iris leaves having pins respectively received in said grooves, a setting ring for said diaphragm, and step-down transmission means operatively coupling said setting ring with said control ring whereby a relatively large angle of rotation of said setting ring corresponds to a relatively small angle of rotation of said control ring, said transmission means comprising a first annular member coupled with said setting ring, a second annular member coupled with said control ring, and a lever element having a longer arm in camming engagement with said first annular member and a shorter arm in camming engagement with said second annular member.

2. The combination according to claim 1 wherein said annular members are provided with slots, said arms being provided with projections positively guided in said slots.

3. The combination according to claim 1 wherein said element is a bell-crank lever.

4. The combination according to claim 1, further comprising a rotatable tube, said control ring constituting a rear face on said tube, said second annular member constituting a forward flange on said tube.

5. A camera objective comprising a generally cylindrical housing, lens means in said housing, an iris diaphragm positioned in said housing in optical alignment with said lens means, said housing being provided with an internal annular shoulder, said iris diaphragm comprising a plurality of arcuate leaves each pivotally anchored to said shoulder, a tubular control member in said housing axially aligned with said diaphragm, said control member having two axially spaced faces, at least one of said faces being provided with a set of oblique grooves, each of said leaves being provided with a pin entering a respective groove on said one of said faces, a setting ring for said diaphragm surrounding said housing, a coupling ring inside said housing entrained by said setting ring for simultaneous rotation, both of said rings being coaxial with said control member, and step-down transmission means in said housing operatively interconnecting said coupling ring with the other face of said control member for translating a relatively large rotation of said setting ring into a relatively small rotation of said control member, said transmission means comprising a bell-crank lever pivotally mounted on said housing, said lever having a long arm in positive camming engagement with said coupling ring and a short arm in positive engagement with said other face of said control member.

6. An objective according to claim 5 wherein each of said leaves is pivotally anchored to said shoulder at one extremity, said pin being mounted on it at a location adjacent said one extremity and remote from the opposite extremity of the leaf, said opposite extremity being freely swingable.

References Cited in the file of this patent

UNITED STATES PATENTS

| | | |
|---|---|---|
| 2,341,387 | Riddell | Feb. 8, 1944 |
| 2,556,546 | Lee | June 12, 1951 |

FOREIGN PATENTS

| | | |
|---|---|---|
| 614,221 | Germany | May 18, 1933 |